US 12,147,826 B2

(12) United States Patent
Green et al.

(10) Patent No.: US 12,147,826 B2
(45) Date of Patent: Nov. 19, 2024

(54) EXTENDING A SOFTWARE DEFINED NETWORK BETWEEN PUBLIC CLOUD COMPUTING ARCHITECTURE AND A DATA CENTER

(71) Applicant: Juniper Networks, Inc., Sunnyvale, CA (US)

(72) Inventors: Simon Green, Swindon (GB); Ovidiu Valeanu, Reading (GB)

(73) Assignee: Juniper Networks, Inc., Sunnyvale, CA (US)

( * ) Notice: Subject to any disclaimer, the term of this patent is extended or adjusted under 35 U.S.C. 154(b) by 457 days.

(21) Appl. No.: 17/448,814

(22) Filed: Sep. 24, 2021

(65) Prior Publication Data
US 2022/0171649 A1    Jun. 2, 2022

Related U.S. Application Data

(60) Provisional application No. 63/119,218, filed on Nov. 30, 2020.

(51) Int. Cl.
*G06F 9/455*      (2018.01)
*G06F 9/445*      (2018.01)
(Continued)

(52) U.S. Cl.
CPC ...... *G06F 9/45558* (2013.01); *G06F 9/44505* (2013.01); *G06F 9/5072* (2013.01);
(Continued)

(58) Field of Classification Search
CPC ... G06F 2009/4557; G06F 2009/45595; G06F 9/45558; G06F 9/44505; G06F 9/5072; H04L 45/64
See application file for complete search history.

(56) References Cited

U.S. PATENT DOCUMENTS 9,276,838 B2    3/2016  Lee et al.
9,495,189 B2 *  11/2016 Shu .................... G06F 9/45558
(Continued)

FOREIGN PATENT DOCUMENTS

CN    103595772 A    2/2014
CN    104685838 A    6/2015
(Continued)

OTHER PUBLICATIONS

Al-Dulaimi et al., "A Framework of Network Connectivity Management in Multi-Clouds Infrastructure", IEEE Wireless Communications, vol. 26, Issue:3, Jun. 2019, IEEE Publishing.*
(Continued)

*Primary Examiner* — Todd L Barker
(74) *Attorney, Agent, or Firm* — Shumaker & Sieffert, P.A.

(57) ABSTRACT

An example system includes first servers deployed in a public cloud computing infrastructure and second servers deployed external to the public cloud computing infrastructure connected to the first servers via a layer 3 network. The first servers include first virtual routers to implement one or more virtual networks and first virtual execution elements. The first virtual execution elements execute a network controller that includes a plurality of microservices. A network device manages network routing for the second servers. The network controller is configured to exchange routing information with the network device. The network controller is configured to configure, based on the routing information, the first virtual routers to configure a virtual network of the one or more virtual networks for packetized communications among the first virtual execution elements executing on the first servers in the public cloud computing infrastructure and the second servers.

18 Claims, 4 Drawing Sheets

(51) Int. Cl.
*G06F 9/50* (2006.01)
*H04L 45/64* (2022.01)

(52) U.S. Cl.
CPC ...... *H04L 45/64* (2013.01); *G06F 2009/4557* (2013.01); *G06F 2009/45595* (2013.01)

(56) References Cited

U.S. PATENT DOCUMENTS

| | | | |
|---|---|---|---|
| 9,571,394 | B1 | 2/2017 | Sivaramakrishnan et al. |
| 9,634,936 | B2 | 4/2017 | Bansal et al. |
| 9,710,762 | B2 | 7/2017 | Nakil et al. |
| 9,898,317 | B2* | 2/2018 | Nakil ................. H04L 41/0895 |
| 10,263,832 | B1* | 4/2019 | Ghosh ................ H04L 43/0823 |
| 10,516,607 | B2 | 12/2019 | Melander et al. |
| 10,565,001 | B2* | 2/2020 | Nakil ................. H04L 41/0856 |
| 10,680,831 | B2* | 6/2020 | Abraham .............. H04L 67/10 |
| 10,999,163 | B2 | 5/2021 | Abraham |
| 11,074,091 | B1 | 7/2021 | Nayakbomman et al. |
| 11,792,126 | B2 | 10/2023 | Mariappan et al. |
| 11,799,772 | B2 | 10/2023 | Drake |
| 2014/0098813 | A1 | 4/2014 | Mishra et al. |
| 2014/0337500 | A1* | 11/2014 | Lee ......................... H04L 41/12 709/223 |
| 2015/0078152 | A1 | 3/2015 | Garg et al. |
| 2016/0188353 | A1* | 6/2016 | Shu .................... G06F 9/45558 718/1 |
| 2016/0277291 | A1 | 9/2016 | Lakshmikanthan et al. |
| 2019/0164907 | A1 | 5/2019 | Chen et al. |
| 2019/0392150 | A1* | 12/2019 | Shevade ............ H04L 61/2517 |
| 2020/0059370 | A1* | 2/2020 | Abraham ............. H04L 9/3263 |
| 2020/0104161 | A1 | 4/2020 | Kapur et al. |
| 2021/0149668 | A1* | 5/2021 | Gupta ..................... G06F 9/547 |

FOREIGN PATENT DOCUMENTS

| | | |
|---|---|---|
| CN | 105306333 A | 2/2016 |
| CN | 105612722 A | 5/2016 |
| CN | 105847069 A | 8/2016 |
| CN | 105915407 A | 8/2016 |
| CN | 107959654 A | 4/2018 |
| CN | 110830357 A | 2/2020 |
| CN | 111274027 A | 6/2020 |
| CN | 111510310 A | 8/2020 |
| CN | 111585780 A | 8/2020 |
| CN | 111669401 A | 9/2020 |
| CN | 111756785 A | 10/2020 |
| EP | 3716533 A1 | 9/2020 |
| IN | 104220988 A | 12/2014 |
| WO | 2013184846 A1 | 12/2013 |
| WO | 2019164907 A1 | 8/2019 |

OTHER PUBLICATIONS

Roozbeh et al., "Software-Defined "Hardware" Infrastructures: A Survey on Enabling Technologies and Open Research Directions", IEEE Communications Surverys and Tutorials, May 9, 2018, pp. 2454-2485, IEEE Publishing.*
Chirivella-Perez et al., "Hybrid and Extensiblle Architecture for Cloud Infrastructure Deployment", IEEE international Conference on Computer and Information Technology, Oct. 2015, IEEE Publishing.*
Xu et al., "WAVNet: Wide-Area Network Virtualization Technique for Virutal Private Cloud" International Conference on Parallel Processing, Sep. 1, 2011, pp. 285-294.*
Chun-Xiang et al., "Research on Cloud Storage Technology Based on MPLS VPN", Department of Information Engineering, Translation provided for Abstract only, Jun. 2017, 3 pp.
First Office Action and Search Report, and translation thereof, from counterpart Chinese Application No. 202111434056.4 dated Dec. 19, 2022, 23 pp.
"Docker Overview," Docker, Inc., Retrieved from: https://web.archive.org/web/20160623192952/https://docs.docker.com/engine/understanding-docker/, accessed date Jun. 23, 2016, 10 pp.
Mackie et al., "BGP-Signaled End-System IP/VPNs draft-ietf-l3vpn-end-system-06," Network Working Group, Internet-Draft, Dec. 15, 2016, 31 pp.
U.S. Appl. No. 63/242,434, by Akkipeddi et al., filed Sep. 9, 2021.
"BGP/MPLS VPN," Jul. 15, 2008, 8 pp.
Alani et al., "Virtual Machines Embedding for Cloud Pon Awgr and Server Based Data Centres", 2019 21st International Conference on Transparent Optical Networks (ICTON), Sep. 19, 2019, p. 5.
Notice of Intent to Grant from counterpart Chinese Application No. 202111434056.4 dated Nov. 23, 2023, 6 pp.
Office Action from counterpart Chinese Application No. 202111434056.4 dated Aug. 30, 2023, 21 pp.
Wei et al., "Traffic Assignment Routing Mechanism for a New Network Architecture," Journal of Chinese Computer Systems, vol. 33, No. 9, Sep. 9, 2012, pp. 1997-2001.
Extended Search Report from counterpart European Application No. 21210785.8 dated Apr. 22, 2022, 14 pp.
Response to Extended Search Report dated Apr. 22, 2022, from counterpart European Application No. 21210785.8 filed Dec. 1, 2022, 19 pp.
Examination Report from counterpart European Application No. 21210785.8 dated Aug. 28, 2024, 11 pp.

* cited by examiner

EXTENDING A SOFTWARE DEFINED NETWORK BETWEEN PUBLIC CLOUD COMPUTING ARCHITECTURE AND A DATA CENTER

This application claims the benefit of U.S. Provisional Application No. 63/119,218, filed Nov. 30, 2020, the entire content of which is incorporated by reference herein.

TECHNICAL FIELD

The disclosure relates to a virtualized computing infrastructure and, more specifically, to extending a software defined network (SDN) between public cloud computing infrastructure and a data center.

BACKGROUND

In a typical public cloud computing infrastructure, there is a large collection of interconnected servers that provide managed microservice-based applications to customers of the public cloud. The public cloud computing infrastructure operators may provide Infrastructure as a Service (IaaS) to customers. IaaS allows customers, such as Information Technology (IT) personnel, to essentially outsource some or all of their infrastructure needs to the public cloud computing infrastructure. Thus, rather than maintain all their own infrastructure, a customer may push some of the services or microservices onto the public cloud computing infrastructure.

These customers may have historically used their own data center(s) for services and/or microservices. A data center may also include a large number of interconnected servers to provide services and microservices. The data center may, for example, include infrastructure equipment, such as networking and storage systems, redundant power supplies, and environmental controls. In a typical data center, clusters of storage systems and application servers are interconnected via high-speed switch fabric provided by one or more tiers of physical network switches and routers. Such data centers may be branch offices, co-location data centers hosting customer equipment, private clouds, or other customer data centers/sites.

Maintaining a data center may be costly and may be an inefficient use of resources if those resources are dedicated and are not being used all the time. As such, customers may be under financial pressure to utilize IaaS and push services and microservices onto public cloud computing infrastructure (e.g., into the "cloud").

SUMMARY

In general, techniques are described for extending a software defined network (SDN) between public cloud computing infrastructure and a data center. As customers deploy microservice-based applications into the public cloud, but require network communications between customer data centers (on-premises) and public cloud, single network tenancy may cause issues when attempting to maintain security and separation of network services. This may make it difficult for customers to migrate applications into public cloud without loss of visibility and control. Additionally, the native gateways of public cloud computing infrastructure may be only able to share a very small number of routes. So not only is the public cloud computing infrastructure single tenancy for a customer, the public cloud can only handle, in some examples, on the order of 400 Border Gateway Protocol (BGP) routes, which usually limits how much services can be scaled in the public cloud.

The techniques of this disclosure may provide one or more technical advantages. For example, by deploying a distributed network controller within the public cloud computing infrastructure as microservices within a virtual private cloud (VPC) and replacing the container network interface with the deployed distributed network controller, a customer may reduce the loss of visibility and control. The techniques may enable extending the SDN between a public cloud computing infrastructure and a customer's data center by effectively extending a Multiprotocol Label Switching (MPLS) data plane between virtual routers, allowing packetized communications between virtual routers of the public cloud and the customer's data center.

According to the techniques of this disclosure, a BGP-based control plane and an MPLS-based data plane may be extended directly into the public cloud managed services, using a distributed SDN controller to provide a BGP-based control plane and virtual routers to provide an overlay-based MPLS data plane directly into the public cloud managed service nodes. This may maintain network tenancy between the on-premise cloud edge and public cloud native applications. Virtual routers may be integrated directly into the operating system of the public cloud managed service nodes. The distributed SDN controller may be deployed as microservices, and hosted within the public cloud managed service itself. In some examples, integration and deployment of the techniques of this disclosure may be automated. In some examples, the integration and deployment of the techniques of this disclosure may be achieved using one or more infrastructure as a service (IaaS) languages such as Cloud-Formation, Terraform, or native Kubernetes Yet Another Markup Language (YAML). Public cloud managed services may be hosted by AMAZON Elastic Kubernetes Service (AMAZON EKS), GOOGLE Kubernetes Engine, and MICROSOFT AZURE Kubernetes Service, for instance.

In one example, the disclosure describes a system comprising first servers deployed in a public cloud computing infrastructure, respective first virtual routers configured for execution by the first servers to implement one or more virtual networks, first virtual execution elements configured for execution by the first servers, a network controller that includes a plurality of microservices configured for execution by the first virtual execution elements, second servers deployed external to the public cloud computing infrastructure and connected to the first servers via a layer 3 network, a network device configured to manage network routing for the second servers, wherein the network controller is configured to exchange routing information with the network device, and wherein the network controller is configured to configure, based on the routing information, the first virtual routers to configure a virtual network of the one or more virtual networks for packetized communications among the first virtual execution elements executing on the first servers in the public cloud computing infrastructure and the second servers.

In one example, the disclosure describes a method comprising executing, by first servers deployed in a public cloud computing infrastructure, respective first virtual routers to implement one or more virtual networks, executing, by the first servers, first virtual execution elements, executing, by the first virtual execution elements, a network controller that includes a plurality of microservices, exchanging routing information between the network controller and the network device, and based on the routing information, configuring, by network controller, the first virtual routers to configure a virtual network of the one or more virtual networks for packetized communications among the first virtual execution elements executing on the first servers in the public cloud computing infrastructure and second servers deployed external to the public cloud computing infrastructure to the first servers via a layer 3 network.

In one example, the disclosure describes a non-transitory computer-readable storage medium storing instructions thereon that when executed cause processor circuitry to execute first virtual routers on first servers deployed in a public cloud computing infrastructure, to implement one or more virtual networks, execute first virtual execution elements on the first servers, execute a network controller that includes a plurality of microservices on the first virtual execution elements, exchange routing information between the network controller and a network device managing network routing for the second servers, and configure, based on the routing information, the first virtual routers to configure a virtual network of the one or more virtual networks for packetized communications among the first virtual execution elements executing on the first servers in the public cloud computing infrastructure and second servers deployed external to the public cloud computing infrastructure to the first servers via a layer 3 network.

The details of one or more embodiments of this disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
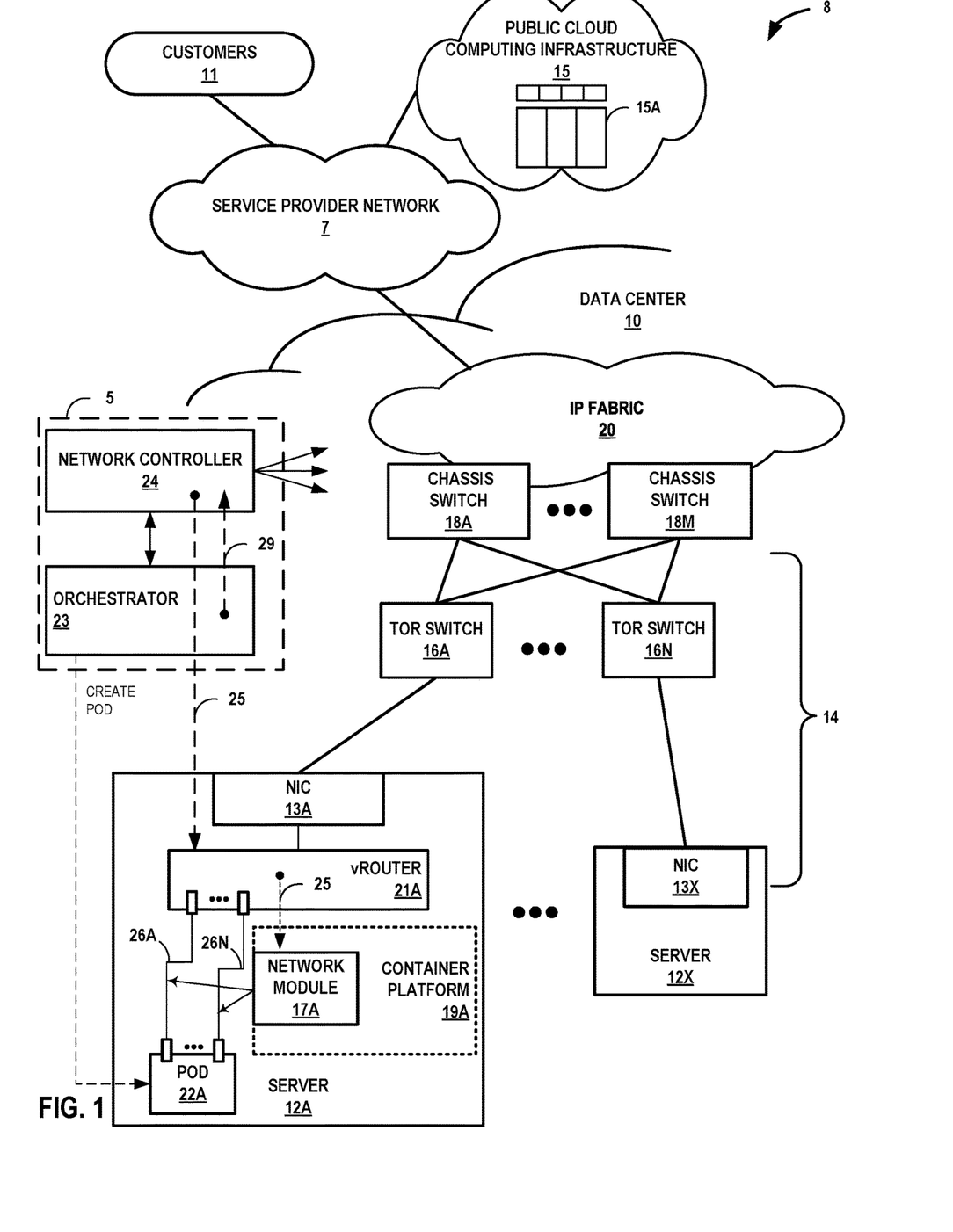
FIG. 1 is a block diagram illustrating an example computing infrastructure in which examples of the techniques described herein may be implemented.

FIG. 1 is a block diagram illustrating an example computing infrastructure 8 in which examples of the techniques described herein may be implemented. In general, data center 10 provides an operating environment for applications and services for a customer sites 11 (illustrated as "customers 11") having one or more customer networks coupled to the data center by service provider network 7. Data center 10 may, for example, include infrastructure equipment, such as networking and storage systems, redundant power supplies, and environmental controls. Service provider network 7 is coupled to public cloud computing infrastructure 15. Public cloud computing infrastructure 15 may represent, for instance, an Infrastructure as a Service (IaaS) and provide services through microservices as a single tenant.

Although customer sites 11 are illustrated and described primarily as edge networks of service provider network 7, in some examples, one or more of customer sites may be tenant networks within data center 10 or another data center. For example, data center 10 may host multiple tenants (customers) each associated with one or more virtual private networks (VPNs), each of which may implement one of customer sites 11. In some examples, data center 10 may host a single tenant.

Service provider network 7 offers packet-based connectivity to attached customer sites 11, data center 10, and public cloud computing infrastructure 15. Service provider network 7 may represent a network that is owned and operated by a service provider to interconnect a plurality of networks. Service provider network 7 may implement Multiprotocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, data center 10 may represent one of many geographically distributed network data centers. As illustrated in the example of FIG. 1, data center 10 may be a facility that provides network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or supercomputing, and so on. Although illustrated as a separate edge network of service provider network 7, elements of data center 10 such as one or more physical network functions (PNFs) or virtualized network functions (VNFs) may be included within the service provider network 7 core.

In this example, data center 10 includes storage and/or compute servers interconnected via switch fabric 14 provided by one or more tiers of physical network switches and routers, with servers 12A-12X (herein, "servers 12") depicted as coupled to top-of-rack switches 16A-16N. Servers 12 are computing devices and may also be referred to herein as "hosts" or "host devices." Although only server 12A coupled to TOR switch 16A is shown in detail in FIG. 1, data center 10 may include many additional servers coupled to other TOR switches 16 of the data center 10.

Switch fabric 14 in the illustrated example includes interconnected top-of-rack (TOR) (or other "leaf") switches 16A-16N (collectively, "TOR switches 16") coupled to a distribution layer of chassis (or "spine" or "core") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10 may also include one or more physical network functions (PNFs) such as physical firewalls, load balancers, routers, route reflectors, broadband network gateways (BNGs), Evolved Packet Cores or other cellular network elements, and other PNFs.

In this example, TOR switches 16 and chassis switches 18 provide servers 12 with redundant (multi-homed) connectivity to IP fabric 20 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center 10 is merely an example. Other switching architectures may have more or fewer switching layers, for instance.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Servers 12 may each represent a compute server, switch, or storage server. For example, each of servers 12 may represent a computing device, such as an x86 processor-based server, configured to operate according to techniques described herein. Servers 12 may provide Network Function Virtualization Infrastructure (NFVI) for an NFV architecture.

Any server of servers 12 may be configured with virtual execution elements by virtualizing resources of the server to provide an isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., data center 10. Each tenant or an application can have one or more virtual networks. Each virtual network may be isolated from all the other virtual networks unless explicitly allowed by security policy.

Virtual networks can be connected to, and extended across physical MPLS Layer 3 Virtual Private Networks (L3VPNs) and Ethernet Virtual Private Networks (EVPNs) networks using a datacenter 10 edge router (not shown in FIG. 1). Virtual networks may also be used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of IP fabric 20 and switching fabric 14 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

As described further below with respect to virtual router 21A, virtual routers running in the kernels or hypervisors of the virtualized servers 12 create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. The underlay physical routers and switches may not contain any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the physical servers 12. (Gateway routers or switches that connect a virtual network to a physical network are an exception and may contain tenant MAC or IP addresses.) In some cases, virtual routers may be packaged and deployed as containers.

Virtual routers 21 of servers 12 often contain per-tenant state. For example, virtual routers 21 may contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). No single virtual router 21 needs to contain all IP prefixes or all MAC addresses for all virtual machines in the entire data center. A given virtual router 21 only needs to contain those routing instances that are locally present on the server 12 (i.e. which have at least one virtual execution element present on the server 12.)

The control plane protocol between the control plane nodes of the network controller 24 or a physical gateway router (or switch) may be BGP (and may be Netconf for management). This is the same control plane protocol may also be used for MPLS L3VPNs and MPLS EVPNs. The protocol between the network controller 24 and the virtual routers 21 may be based on XMPP, for instance. The schema of the messages exchanged over XMPP may accord with Mackie et. al, "BGP-Signaled End-System IP/VPNs," draft-ietf-l3vpn-end-system-06, Dec. 15, 2016, which is incorporated by reference herein in its entirety. Control plane nodes may be packaged and deployed as containers. In some cases, a cloud native router may operate as a control plane for virtual routers and, e.g., receive and advertise routes, perform route selection, and program the virtual router to operate as a data plane for the nodes. Additional description regarding a cloud native router is found in U.S. Patent Application No. 63/242,434, filed Sep. 9, 2021, and entitled "Containerized Router with Virtual Networking," the entire contents of which is incorporated by reference herein.

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS rkt ("Rocket"). Like a virtual machine, each container is virtualized and may remain isolated from the host machine and other containers. However, unlike a virtual machine, each container may omit an individual operating system and provide only an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel. LXC is an operating-system-level virtualization method for running multiple isolated Linux systems (containers) on a single control host (LXC host). An LXC does not use a virtual machine (although an LXC may be hosted by a virtual machine). Instead, an LXC uses a virtual environment with its own CPU, memory, block I/O, network, and/or other resource space. The LXC resource control mechanism is provided by namespaces and cgroups in the Linux kernel on the LXC host. Additional information regarding containers is found in "Docker Overview," Docker, Inc., available at docs.docker.com/engine/understanding-docker, last accessed Jul. 9, 2016. Additional examples of containerization methods include OpenVZ, FreeBSD jail, AIX Workload partitions, and Solaris containers. Accordingly, as used herein, the term "containers" may encompass not only LXC-style containers but also any one or more of virtualization engines, virtual private servers, silos, or jails.

An application suite and the application-specific libraries of a container may be a microservice for a larger application. For example, an application may be configured as a plurality of microservices, and each microservice provides a subset of functionality of all of the functionality provided by the application. As described in more detail, network controller 24 is an example of software that is architected as a plurality of microservices. This allows network controller 24 to be distributed among a plurality of servers 12. For example, one or more of servers 12 each execute one or more of the microservices as a way to execute network controller 24. A container may include the microservice and its specific libraries, and the microservice may execute by the host machine as an isolated user-space instance and may share an operating system and common libraries with other containers executing on the host machine. As such, the network controller 24 may include multiple microservices executed by respective containers that are distributed among and executed by servers 12. In some examples, according to the techniques of this disclosure, another network controller similar to network controller 24 may execute on servers 15A within public cloud computing infrastructure 15.

Servers 12 host virtual network endpoints for one or more virtual networks that operate over the physical network represented here by IP fabric 20 and switch fabric 14. Although described primarily with respect to a data center-based switching network, other physical networks, such as service provider network 7, may underlay the one or more virtual networks.

Each of servers 12 may host one or more virtual execution elements each having at least one virtual network endpoint for one or more virtual networks configured in the physical network. A virtual network endpoint for a virtual network may represent one or more virtual execution elements that share a virtual network interface for the virtual network. For example, a virtual network endpoint may be a virtual machine, a set of one or more containers (e.g., a pod), or another other virtual execution element(s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers. As shown in FIG. 1, server 12A hosts one virtual network endpoint in the form of pod 22A having one or more containers. However, a server 12 may execute as many virtual execution elements as is practical given hardware resource limitations of the server 12. Each of the virtual network endpoints may use one or more virtual network interfaces to perform packet I/O or otherwise process a packet. For example, a virtual network endpoint may use one virtual hardware component (e.g., an SR-IOV virtual function) enabled by network interface card (NIC) 13A to perform packet I/O and receive/send packets on one or more communication links with TOR switch 16A. Other examples of virtual network interfaces are described below.

Servers 12 each includes at least one NIC 13, which each includes at least one interface to exchange packets with TOR switches 16 over a communication link. For example, server 12A includes NIC 13A. Any of NICs 13 may provide one or more virtual hardware components 21 for virtualized input/output (I/O). A virtual hardware component for I/O may be a virtualization of a physical NIC 13 (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interfaces as "virtual functions" for use by respective endpoints executing on the server 12. In this way, the virtual network endpoints may share the same PCIe physical hardware resources and the virtual functions are examples of virtual hardware components 21. As another example, one or more servers 12 may implement Virtio, a para-virtualization framework available, e.g., for the Linux Operating System, that provides emulated NIC functionality as a type of virtual hardware component to provide virtual network interfaces to virtual network endpoints. As another example, one or more servers 12 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints. In some instances, the virtual hardware components are virtual I/O (e.g., MC) components. In some instances, the virtual hardware components are SR-IOV virtual functions. In some examples, any server of servers 12 may implement a Linux bridge that emulates a hardware bridge and forwards packets among virtual network interfaces of the server or between a virtual network interface of the server and a physical network interface of the server. For Docker implementations of containers hosted by a server, a Linux bridge or other operating system bridge, executing on the server, that switches packets among containers may be referred to as a "Docker bridge." The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12.

Any of NICs 13 may include an internal device switch to switch data between virtual hardware components 21 associated with the NIC. For example, for an SR-IOV-capable NIC, the internal device switch may be a Virtual Ethernet Bridge (VEB) to switch between the SR-IOV virtual functions and, correspondingly, between endpoints configured to use the SR-IOV virtual functions, where each endpoint may include a guest operating system. Internal device switches may be alternatively referred to as NIC switches or, for SR-IOV implementations, SR-IOV NIC switches. Virtual hardware components associated with NIC 13A may be associated with a layer 2 destination address, which may be assigned by the NIC 13A or a software process responsible for configuring NIC 13A. The physical hardware component (or "physical function" for SR-IOV implementations) is also associated with a layer 2 destination address.

To switch data between virtual hardware components associated with NIC 13A, internal device switch may perform layer 2 forwarding to switch or bridge layer 2 packets between virtual hardware components and the physical hardware component for NIC 13A. Each virtual hardware component may be located on a virtual local area network (VLAN) for the virtual network for the virtual network endpoint that uses the virtual hardware component for I/O.

One or more of servers 12 may each include a virtual router 21 that executes one or more routing instances for corresponding virtual networks within data center 10 to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). Packets received by the virtual router (vROUTER) 21A of server 12A, for instance, from the underlying physical network fabric of data center 10 (i.e., IP fabric 20 and switch fabric 14) may include an outer header to allow the physical network fabric to tunnel the payload or "inner packet" to a physical network address for a NIC 13A of server 12A that executes the virtual router. The outer header may include not only the physical network address of NIC 13A of the server but also a virtual network identifier such as a VxLAN tag or Multiprotocol Label Switching (MPLS) label that identifies one of the virtual networks as well as the corresponding routing instance executed by the virtual router 21A. An inner packet includes an inner header having a destination network address that conforms to the virtual network addressing space for the virtual network identified by the virtual network identifier.

Virtual routers 21 terminate virtual network overlay tunnels and determine virtual networks for received packets based on tunnel encapsulation headers for the packets, and forwards packets to the appropriate destination virtual network endpoints for the packets. For server 12A, for example, for each of the packets outbound from virtual network endpoints hosted by server 12A (e.g., pod 22A), the virtual router 21A attaches a tunnel encapsulation header indicating the virtual network for the packet to generate an encapsulated or "tunnel" packet, and virtual router 21A outputs the encapsulated packet via overlay tunnels for the virtual networks to a physical destination computing device, such as another one of servers 12. As used herein, a virtual router 21 may execute the operations of a tunnel endpoint to encapsulate inner packets sourced by virtual network endpoints to generate tunnel packets and decapsulate tunnel packets to obtain inner packets for routing to other virtual network endpoints.

Computing infrastructure 8 implements an automation platform for automating deployment, scaling, and operations of virtual execution elements across servers 12 to provide virtualized infrastructure for executing application workloads and services. In some examples, the platform may be a container orchestration platform that provides a container-centric infrastructure for automating deployment, scaling, and operations of containers to provide a container-centric infrastructure. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

Elements of the automation platform of computing infrastructure 8 include at least servers 12, orchestrator 23, and network controller 24. Virtual execution elements may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily virtual execution element hosting devices of a cluster. For example, the Kubernetes platform uses the terms "cluster master" and "minion nodes," while the Docker Swarm platform refers to cluster managers and cluster nodes.

Orchestrator 23 and network controller 24 together implement a controller 5 for the computing infrastructure 8. Orchestrator 23 and network controller 24 may execute on separate computing devices, execute on the same computing device. Each of orchestrator 23 and network controller 24 may be a distributed application that executes on one or more computing devices. Orchestrator 23 and network controller 24 may implement respective master nodes for one or more clusters each having one or more minion nodes implemented by respective servers 12. In general, network controller 24 controls the network configuration of the data center 10 fabric to, e.g., establish one or more virtual networks for packetized communications among virtual network endpoints. Network controller 24 provides a logically and in some cases physically centralized controller for facilitating operation of one or more virtual networks within data center 10. In some examples, network controller 24 may operate in response to configuration input received from orchestrator 23 and/or an administrator/operator. Additional information regarding network controller 24 operating in conjunction with other devices of data center 10 or other software-defined network is found in International Application Number PCT/US2013/044378, filed Jun. 5, 2013, entitled "PHYSICAL PATH DETERMINATION FOR VIRTUAL NETWORK PACKET FLOWS" and published as International Publication No. WO 2013/184846 on Dec. 12, 2013; and in U.S. Pat. No. 9,571,394, issued on Feb. 14, 2017, and entitled "Tunneled Packet Aggregation for Virtual Networks," each which is incorporated by reference as if fully set forth herein. U.S. Pat. No. 9,571,394 also includes further description of a virtual router, such as virtual router 21A. Application programming interface endpoints for a controller described in PCT/US2013/044378 and U.S. Pat. No. 9,571,394 may be implemented as orchestration platform resources, such a services and ingresses, according to techniques described herein.

In general, orchestrator 23 controls the deployment, scaling, and operations of virtual execution elements across clusters of servers 12 and providing computing infrastructure, which may include container-centric computing infrastructure. Orchestrator 23 and, in some cases, network controller 24 may implement respective cluster masters for one or more Kubernetes clusters. As an example, Kubernetes is a container management platform that provides portability across public and private clouds, each of which may provide virtualization infrastructure to the container management platform.

In one example, pod 22A is a Kubernetes pod and an example of a virtual network endpoint. A pod is a group of one or more logically-related containers (not shown in FIG. 1), the shared storage for the containers, and options on how to run the containers. Where instantiated for execution, a pod may alternatively be referred to as a "pod replica." Each container of pod 22A is an example of a virtual execution element. Containers of a pod are always co-located on a single server, co-scheduled, and run in a shared context. The shared context of a pod may be a set of Linux namespaces, cgroups, and other facets of isolation. Within the context of a pod, individual applications might have further sub-isolations applied. Typically, containers within a pod have a common IP address and port space and are able to detect one another via the localhost. Because they have a shared context, containers within a pod are also communicate with one another using inter-process communications (IPC). Examples of IPC include SystemV semaphores or POSIX shared memory. Generally, containers that are members of different pods have different IP addresses and are unable to communicate by IPC in the absence of a configuration for enabling this feature. Containers that are members of different pods instead usually communicate with each other via pod IP addresses.

Server 12A includes a container platform 19A for running containerized applications, such as those of pod 22A. Container platform 19A receives requests from orchestrator 23 to obtain and host, in server 12A, containers. Container platform 19A obtains and executes the containers. As one example, container platform 19A may be configured to execute one or more microservices that provide a part of the functionality of network controller 24.

Container platform 19A includes a network module 17A that configures virtual network interfaces for virtual network endpoints. The container platform 19A uses network module 17A to manage networking for pods, including pod 22A. For example, the network module 17A creates virtual network interfaces to connect pods to virtual router 21A and enable containers of such pods to communicate, via the virtual network interfaces, to other virtual network endpoints over the virtual networks. Network module 17A may, for example, insert a virtual network interface for a virtual network into the network namespace for containers of in pod 22A and configure (or request to configure) the virtual network interface for the virtual network in virtual router 21A such that the virtual router 21A is configured to send packets received from the virtual network via the virtual network interface to containers of pod 22A and to send packets received via the virtual network interface from containers of pod 22A on the virtual network. Network module 17A may assign a network address (e.g., a virtual IP address for the virtual network) and may setup routes for the virtual network interface. In Kubernetes, by default all pods can communicate with all other pods without using network address translation (NAT). In some cases, the orchestrator 23 and network controller 24 create a service virtual network and a pod virtual network that are shared by all namespaces, from which service and pod network addresses are allocated, respectively. In some cases, all pods in all namespaces that are spawned in the Kubernetes cluster may be able to communicate with one another, and the network addresses for all of the pods may be allocated from a pod subnet that is specified by the orchestrator 23. When a user creates an isolated namespace for a pod, orchestrator 23 and network controller 24 may create a new pod virtual network and new shared service virtual network for the new isolated namespace. Pods in the isolated namespace that are spawned in the Kubernetes cluster draw network addresses from the new pod virtual network, and corresponding services for such pods draw network addresses from the new service virtual network Network module 17A may represent a library, a plugin, a module, a runtime, or other executable code for server 12A. Network module 17A may conform, at least in part, to the Container Networking Interface (CNI) specification or the rkt Networking Proposal. Network module 17A may represent a Contrail or OpenContrail network plugin. Network module 17A may alternatively be referred to as a network plugin or CNI plugin or CNI instance. For purposes of the CNI specification, a container can be considered synonymous with a Linux network namespace. What unit this corresponds to depends on a particular container runtime implementation: for example, in implementations of the application container specification such as rkt, each pod runs in a unique network namespace. In Docker, however, network namespaces generally exist for each separate Docker container. For purposes of the CNI specification, a network refers to a group of entities that are uniquely addressable and that can communicate amongst each other. This could be either an individual container, a machine/server (real or virtual), or some other network device (e.g. a router). Containers can be conceptually added to or removed from one or more networks.

The CNI specification specifies a number of considerations for a conforming plugin ("CNI plugin"). These include the following:

The container runtime must create a new network namespace for a container before invoking any CNI plugin.

The container runtime must then determine which networks this container should belong to, and for each network, which plugins must be executed.

The container runtime must add the container to each network by executing the corresponding plugins for each network sequentially.

Network controller 24 may be architected and implemented as a plurality of microservices, where each microservice may be an application of a container. As one example, network controller 24 is architected as a plurality of microservices, where each of the microservices performs part of the functionality of network controller 24. There is a plurality of microservices, but each of the microservices need not necessarily be completely distinct from one another. For example, one or more microservices may operate together to perform a set of operations of network controller 24.

As one example, network controller 24 may perform the following example tasks: define interconnection tunnels between servers 12, provide analysis of the network (e.g., switch fabric 14), provide a mechanism to execute third-party tools, and manage execution of virtual routers (e.g., like virtual router 21A). The above example tasks of network controller 24 should not be considered as limiting. Network controller 24 may perform more tasks than the above example tasks or may perform fewer tasks than the above example tasks. For ease of illustration and description, network controller 24 is described as performing the above example tasks.

To manage the deployment of microservices of network controller 24 to perform the example techniques, memory (e.g., memory on one or more servers 12) stores a plurality of charts. One example of charts, in the context of Kubernetes, is the so-called Helm chart. The plurality of charts package one or more microservices together and define the manner which the one or more microservices are to be deployed. In other words, network controller 24 is configured as a plurality of microservices packaged and deployed via the plurality of charts. Each of the charts includes one or more templates that define a manner in which respective microservices, for performing respective operations of network controller 24, are deployed on respective servers 12 within data center 10.

As an example, to construct the charts, an administrator may provide image name of respective microservices in charts, and defines the respective containers, such as using a Kubernetes interface. The administrator, on a local computer, may execute a package manager, such as the Helm package manager for Kubernetes, to construct the plurality of charts. Each chart includes a templates section with which the administrator defines the microservices for that chart, and the manner in which the microservices are to be deployed. As one example, the templates may be in the form of .yaml files, and the .yaml file for a first microservice may define the ports that are accessible by the microservice, the order in which the microservice is to execute, where the microservice is to output its data, to which container the microservice belongs, etc. Factors such as port accessibility, order of execution, where to output data, and to which container the microservice is to output its data are all examples of a manner in which a microservice is deployed. There may be more or fewer parameters or items in the template file (e.g., .yaml file) of the microservice than the examples provided above, and such parameters or items are also examples of the manner in which a microservice is deployed.

In one or more examples, there is a chart for each of the example tasks. For example, the administrator creates a chart for microservices that define interconnection tunnels between servers 12, referred to as a control chart, creates a chart for microservices that provide analysis of the network (e.g., switch fabric 14), referred to as analytics chart, creates a chart for microservices that provide a mechanism to execute third-party tools, referred to as third-party chart, and creates a chart for microservices that manage execution of virtual routers (e.g., like virtual router 21A), referred to as virtual router chart.

Configuring network controller 24 as containerized microservices may provide one or more technical advantages. It should be understood that the potential advantages of configuring network controller 24 as containerized microservices is not always necessary. As one example, configuring network controller 24 as containerized microservices may facilitate the use Kubernetes or other types of orchestration, and the advantages associated with such orchestration. Kubernetes, as an example, provides for functionality such as health checks, rolling upgrades, and resource management so that Kubernetes orchestration can manage the microservices and ensure that the container and pods of containers are communicating correctly with one another, are able to be accessed via a common ingress or egress point, are being scaled up properly, and the like.

Moreover, using charts as a way to package and deploy microservices for different tasks may provide additional benefits. The rolling upgrades provided by Kubernetes function well for minor upgrades, but relying simply on Kubernetes, without any further definition for how to deploy microservices, to provide functionality for major upgrades may not be feasible.

For instance, in service software upgrades (ISSU) of microservices of network controller 24 may be better managed with the use of the example charts, where each chart defines a manner in which the respective microservices are deployed. With ISSU, network controller 24 should be upgraded while network controller 24 is operating. For example, while a first version of network controller 24 is executing, a second version (e.g., updated version) of network controller 24 can be installed, and then the first version of network controller 24 is disabled after migrating servers 12 to second version of network controller 24. In some techniques, such as where network controller 24 is not configured as microservices, such in service upgrades would not be feasible because the functionality of network controller 24 was not properly apportioned to microservices and to the extent there was apportioning of the functionality of network controller 24, the apportioning is not done in a containerized form. Therefore, for these other techniques, it may not have been feasible to only upgrade a portion of network controller 24 without needing to temporarily disable operation of network controller 24.

With the user of the charts, ISSU of network controller 24 may be more feasible, as compared to other examples of network controllers. For instance, when time to upgrade network controller 24 from first version to second version, the administrator may update values or other configuration information of the chart or charts needed for the upgrade. For example, the administrator may upgrade the templates of the charts to define the deployment of the new microservices of network controller 24, where the new microservices may be the upgraded versions of existing microservices or microservices that were previously not part of network controller 24.

To perform the ISSU, the processing circuitry, which may be distributed across one or more servers 12, may receive updated charts, in what is called as a release of the chart, that defines the deployments of the new microservices. In one or more examples, the updated charts may be the same as previous charts, such as identifying the same set of microservices. However, the microservices may be upgraded, and the configuration information or other values such as manifest may change. In other words, the microservices of a chart may remain the same, but the version of the microservices may be change as part of the upgrade. In one or more examples, the updated charts may be updated to identify new or different microservices rather than just upgrades of a microservice. Updated charts describe both such examples.

The processing circuitry may currently be causing network controller 24 to execute on a first set of containers. The processing circuitry may cause the upgraded microservices to execute on a second set of containers, that may be different than the first set of containers. The processing circuitry may also cause the existing microservices (e.g., those that were not upgrades) to execute as another instantiation of the microservices on the second set of containers. Once the upgraded network controller 24 is executing on the second containers, the processing circuitry may disable execution of network controller 24 on the first set of containers. In this way, the processing circuitry upgrades network controller 24 in service while network controller 24 is still executing to perform the ISSU, as sometimes called as an AB upgrade.

The use of the plurality of charts may allow for deployment of microservices in a way that does not disrupt operation of network controller 24 during the ISSU. As one example, as described above, the example charts include the control chart, analytics chart, virtual router chart, and third-party chart. By forming the charts in this example manner, piecemeal updates of the various functionality of network controller 24 may be possible in a non-disrupting manner. As another example of the technical advantages of a microservices-based network controller 24 executing on a container-centric computing architecture, network controller 24 may permit the use of orchestration platform resources for exposing one or more interfaces of the network controller to an orchestration system. For instance, endpoints of a network controller 24 application programming interface (API) may be exposed using services and ingresses of the orchestration platform having orchestrator 23. For example, orchestrator 23 may request, using network controller 24 APIs exposed using services and ingress, network configurations for switching fabric 14 and servers 12 to facilitate communications among virtual execution elements managed by the orchestrator 23.

For instance, network controller 24 may be executing on a first set of virtual containers on servers 12. The processing circuitry (e.g., on which network controller 24 is executing) may receive an updated control chart (e.g., release of updated version of control chart for second, updated version of network controller 24). The processing circuitry may execute the microservices identified in the updated control chart on a second set of containers on servers 12 to allow for parallel operation so that network controller 24 can be upgraded without disruption in service.

Moreover, by separating out the analytics chart from the control chart, the current version(s) of the microservices of the analytics chart can remain executing while the second set of containers on servers 12 begin the execution of the microservices of the control chart. As part of the configuring of the microservices of the updated control chart, the processing circuitry executes a plurality of "jobs" that spin up to perform initialization and configuration tasks, and then disable. In some examples, one of the jobs for configuring microservices of the updated control chart may cause the microservices of the updated control chart and the microservices of the current control chart to both communicate with the current version(s) of the microservices of the analytics chart. In this case, both the current and updated version(s) of the microservices of the control chart would have access to the microservices of the analytics chart.

The processing circuitry may receive an updated virtual router chart. In this example, one or more jobs may execute on the processing circuitry to migrate the containers executing the microservices of the current virtual router chart to execute the containers executing the microservices of the updated virtual router chart one at a time. By separating out the microservices based on their functionality into the different example charts, the microservices of the virtual router can be migrated one at a time, while the upgraded microservices of the updated control chart are executing in parallel with the current microservices of the current control chart. For example, the upgrades of the control functionality and virtual router functionality can be updated piecemeal.

The processing circuitry may receive an updated analytics chart. The processing circuitry may execute the microservices of the updated analytics chart, and execute one or more jobs to configured the microservices of the updated control chart to communicate with the microservices of the updated analytics chart. Once this process is over, the processing circuitry may be executing the new version of network controller 24 and can disable execution of the old (previously current) version network controller 24.

The processing circuitry may perform similar operations for the third-party chart. With the third-party chart, the microservices may be for third-party tools provided by external developers. In some examples, the only update for network controller 24 may be the change in the third-party tools. By separating out the third-party chart from the rest of the charts, it may be possible to only update network controller 24 with the new microservices for the third-party tool.

There may be other manners in which separating the charts to include microservices for separate distinct functionalities of network controller 24 may be beneficial. For instance, a database (e.g., distributed across one or more servers 12) stores information of the current state of the network including the virtual network defined by network controller 24. The control chart may define the microservices that perform the functionality of setting up the virtual network and storing the state information in the database. During an upgrade of network controller 24, it may be very important to ensure that the database is not corrupted and that the state information in the database is not lost. Otherwise, the upgraded network controller 24 may not route traffic correctly. Therefore, the control chart may define deployment of the respective microservices used to define the interconnection tunnels such that the database storing the state information is first synchronized with the new microservices before disabling the existing execution of network controller 24.

As another example, the microservices of network controller 24 that perform the analytics functionality may be configured to regularly store analytics information in a backup database. For an upgrade, the analytics chart that defines the microservices that perform the analytics functionality may define deployment of the respective microservices used to perform the analytics functionality to rely on the backup database, rather than needing to synchronize with a database that stores the analytics information.

Further information on a microservices-based network controller, such as network controller 24, may be found in U.S. Pat. No. 11,074,091 entitled DEPLOYMENT OF MICROSERVICES-BASED NETWORK CONTROLLER, issued on Jul. 27, 2021, which is incorporated herein by reference in its entirety.

According to the techniques of this disclosure, a BGP-based control plane and a Multiprotocol Label Switching (MPLS)-based data plane may be extended directly into the public cloud computing infrastructure 15, using a distributed, containerized SDN controller executing on servers 15A to provide a BGP-based control plane and virtual routers to provide an overlay-based MPLS data plane directly into the public cloud managed service nodes for a customer deployment, e.g., a virtual private cloud. This may maintain network tenancy between the on-premise cloud edge and public cloud native applications. Virtual routers may be integrated directly into the operating system of the public cloud managed service nodes. The distributed SDN controller may be deployed as microservices, and hosted within the public cloud managed service itself. In some examples, integration and deployment of the techniques of this disclosure may be automated. In some examples, the integration and deployment of the techniques of this disclosure may be achieved using one or more infrastructure as a service (IaaS) languages such as CloudFormation, Terraform, or native Kubernetes Yet Another Markup Language (YAML).

Figure 2:
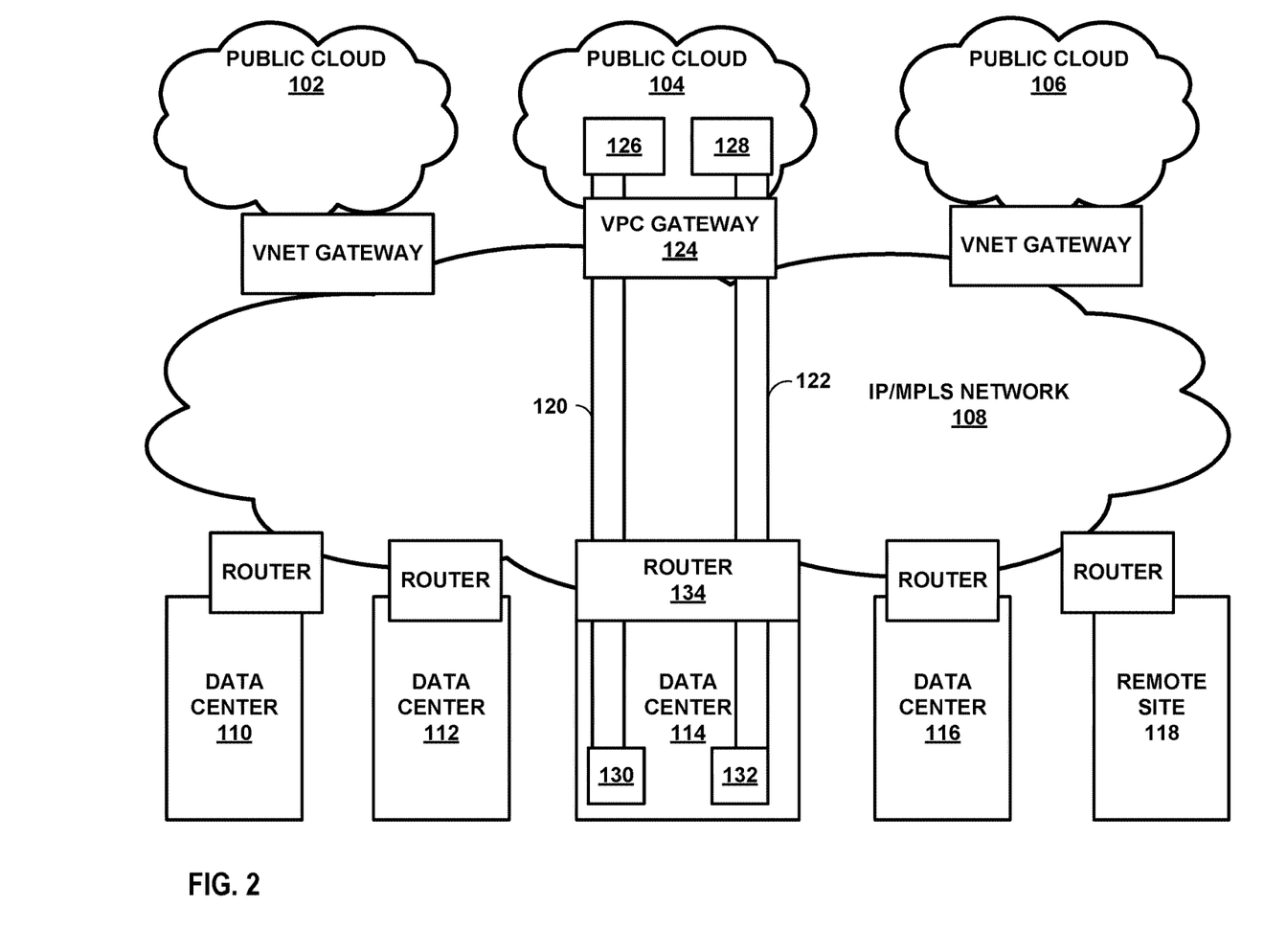
FIG. 2 is a block diagram of an example system for extending a software defined network (SDN) between public cloud computing infrastructure and a data center according to the techniques described in this disclosure.

FIG. 2 is a block diagram of an example system for extending a software defined network (SDN) between public cloud computing infrastructure and a data center according to the techniques described in this disclosure. System 100 includes public cloud 102, public cloud 104, and public cloud 106. Each of public clouds 102, 104, and 106 may include a plurality of servers, such as servers 126 and 128 of public cloud 104. As such, public clouds 102, 104, and 106 include public cloud computing infrastructure. Each of public clouds 102, 104, and 106 may include a virtual network (Vnet) Gateway or a virtual private cloud (VPC) Gateway, such as VPC Gateway 124. System 100 may include an IP/MPLS network 108, which may be a service provider network. IP/MPLS network 108 may include network elements such as routers which may be used to route network traffic to and from public clouds 102, 104, and 106 through the Vnet Gateway or the VPC Gateway, such as VPC Gateway 124. IP/MPLS network 108 may be a service provider layer 3 network.

System 100 may also include a number of data centers, such as data centers 110, 112, 114, and 116, and one or more remote sites, such as remote site 118. The data centers 110, 112, 114, and 116, and remote site 118 may be external to the public clouds 102, 104 and 106, as shown. Each of the data centers 110, 112, 114, and 116 may include a plurality of servers, such as servers 130 and 132 of data center 114. Remote site 118 may also include one or more servers. Data centers 110, 112, 114, and 116 may be connected to IP/MPLS network 108 through gateway routers such as router 134 to the network 108 edge. Servers 130 and 132 may be connected to servers 126 and 128 through a layer 3 network, such as IP/MPLS network 108.

Servers 126 and 128 may execute respective first virtual routers to implement one or more virtual networks. Servers 126 and 128 may also execute first virtual execution elements. The first virtual execution elements may execute a network controller, similar to network controller 24, that includes a plurality of microservices. In some examples, these microservices include daemon sets. In some examples, the network controller sits inside the minions of a virtual private cloud. The network controller may be distributed across a plurality of virtual execution elements. In some examples, the network controller may be distributed among a plurality of servers, such as server 126 and server 128.

The data centers, such as data center 114 may include a network device that is configured to manage network routing for the second servers, such as server 130 and server 132. In some examples, the network device may be a network controller, like network controller 24 of FIG. 1. In the case where the network device is a network controller, the network controller of the public cloud computing infrastructure and the network controller of the data center may federate or share resources between the public cloud computing infrastructure and the data center. This federation may be possible by extending the BGP control plane between the two controllers via BGP tunnel 120. In other examples, the network device may be a layer 3 router. BGP tunnel 120 may comprise a BGP session.

The network controller executing in public cloud 104 may exchange routing information with the network device in the data center (such as data center 114, through, for example, BGP tunnel 120. The network controller may be configured to configure, based on the routing information, the first virtual routers to configure a virtual network for packetized communications among the first virtual execution elements executing on the first servers in the public cloud computing infrastructure and the second servers in a data center, such as servers 130 and 132 in data center 114. For example, the first virtual routers may configure the virtual network through one of more MPLS tunnels 122 which may carry the packetized communications between the first virtual routers executing on the first servers (e.g., servers 126 and 128) and routers of the data center (e.g., data center 114). In some examples, the routers of the data center may be second virtual routers executing on the second servers (e.g., servers 130 and 132). In some examples, the one or more MPLS 122 tunnels may be MPLS over User Datagram Protocol (MPLSoUDP) tunnels. In other examples, the one or more MPLS tunnels may be MPLS over MPLS tunnels.

In some examples, the network controller is configured to provide a Container Network Interface (CNI) for configuring network interfaces for the first virtual execution elements. For example, the network controller executed by nodes of the managed service may configure network interfaces for other nodes of the managed service.

In some examples, the second servers, such as servers 130 and 132, may be deployed in an on-premise cloud edge. In some examples, the first servers, such as servers 126 and 128 may be configured to execute a Kubernetes service. In some examples, the first virtual execution elements include minion nodes of a Kubernetes cluster.

As such, in some examples, the techniques include deploying a network controller within the public cloud infrastructure managed service. Because there are ordinarily limitations due to the public cloud having control over the networking within the public clouds, the techniques include replacing the CNI of managed service nodes (e.g., Kubernetes minion nodes) with a network controller executing on the managed service nodes as distributed microservices. This provides the customer/tenant with an additional measure of control over the public cloud network sufficient to extend the BGP control plane and MPLS data plane between virtual routers for the managed service hosted by the public cloud and physical routers or virtual routers in the customer data centers/sites, thereby facilitating network communications between the public cloud customer application deployment and the customer application data center/site deployment.

Figure 3:
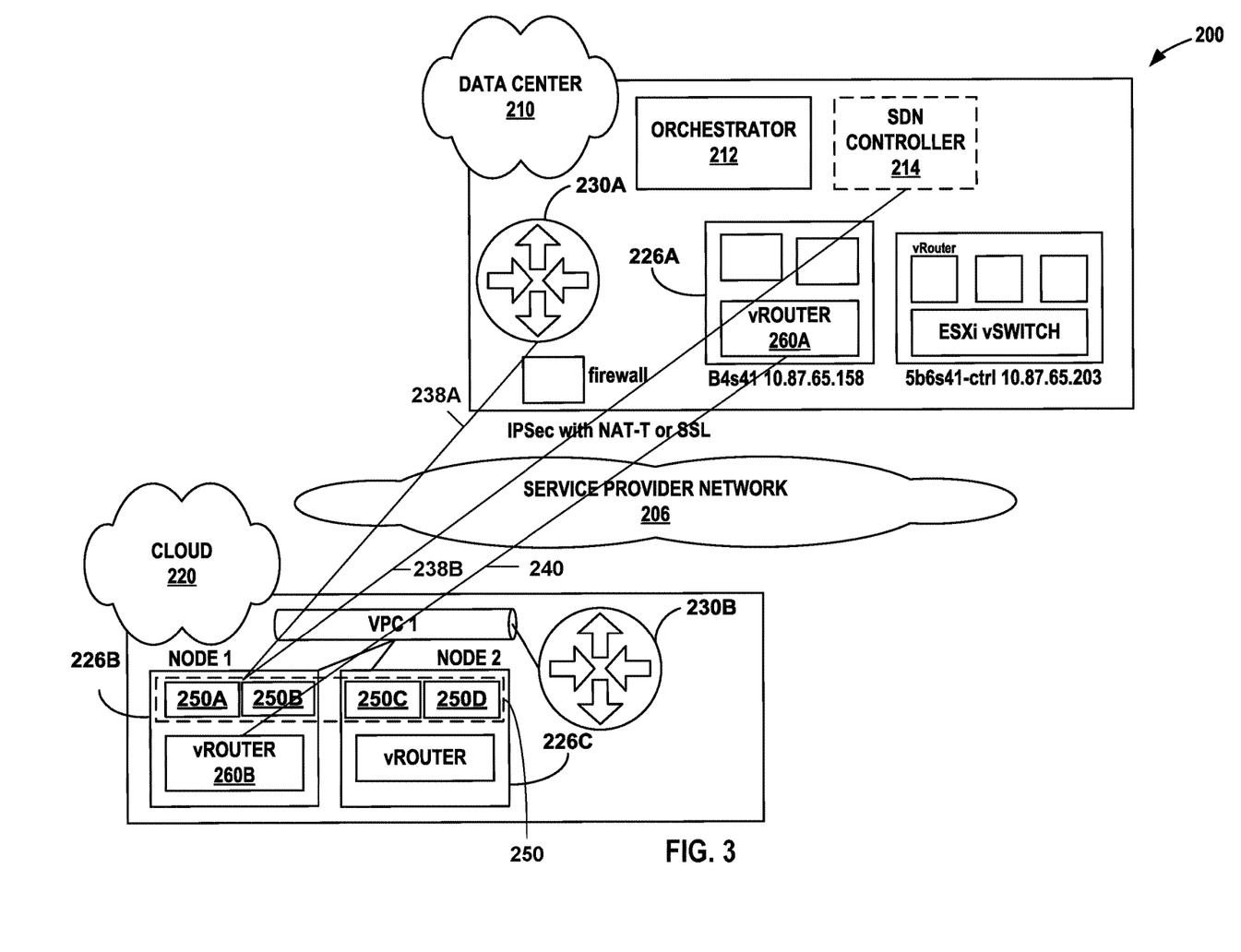
FIG. 3 is a block diagram illustrating an example network including a distributed SDN controller for directing information within the network according to techniques described in this disclosure.

FIG. 3 is a block diagram illustrating an example network 200 including a distributed SDN controller for directing information within network 200, according to techniques described in this disclosure. In this example, distributed SDN controller 250 is implemented as microservices 250A, 250B, 250C, and 250D, which together form distributed SDN controller 250 (shown in dashed lines). Distributed SDN controller 250 provides a logically and in some cases physically centralized controller for facilitating operation of one or more virtual networks within each of data center 210 and public cloud computing infrastructure 220, such as VPC 1 of public cloud computing infrastructure 220, in accordance with one or more embodiments of this disclosure.

Distributed SDN controller 250 may extend the BGP control plane between public cloud computing infrastructure 220 and data center 210 through a network device of data center 210. In some examples, data center 210 may include an SDN controller 214 (shown in dashed lines). In the examples where data center 210 includes SDN controller 214, distributed SDN controller of public cloud computing infrastructure 220 and SDN controller 214 of data center 210 may federate or share resources between public cloud computing infrastructure 220 and data center 210. This federation may be possible by extending the BGP control plane between distributed SDN controller 250 and SDN controller 214 through the creation and use of a BGP tunnel 238B. In the examples, where data center 210 does not include SDN controller 214, distributed SDN controller 250 may extend the BGP control plane between distributed SDN controller 250 and data center 210 via gateway 230A, which may be an example of a layer 3 router.

In some examples, orchestrator 212 manages functions of data center 210 such as compute, storage, networking, and application resources. For example, orchestrator 212 may create a virtual network for a tenant within data center 210 or across data centers. Orchestrator 212 may attach virtual machines (VMs) to a tenant's virtual network. Orchestrator 212 may connect a tenant's virtual network to an external network, e.g. the service provider network 206 (which may be a layer 3 network) or public cloud computing infrastructure 220. Orchestrator 212 may implement a security policy across a group of VMs or to the boundary of a tenant's network. Orchestrator 212 may deploy a network service (e.g. a load balancer) in a tenant's virtual network. In some examples, SDN controller 214 maintains routing, networking, and configuration information within a state database. In some examples, orchestrator 212 uses Kubernetes for automating deployment, scaling, and management of containerized applications. For example, orchestrator 212 may use Kubernetes to deploy containers to any one of servers 226A-226C (collectively, "servers 226") via SDN controller 214. In some cases, different orchestrators in the data center 210, cloud 220 control respective groups of servers located in those different contexts. In some examples, the containers may include Docker containers. Orchestrator 212 may output instructions to SDN controller 214 to deploy containers to servers 226 via gateway 230.

Groups of servers 226 (e.g., server 226B and 226C) may be interconnected via a high-speed switch fabric (not shown) provided by one or more tiers of physical network switches and routers. The switch fabric is provided by a set of interconnected top-of-rack (TOR) switches (not shown) coupled to a distribution layer of chassis switches (not shown). Although not shown, each of data center 210 and public cloud computing infrastructure 220 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Each server of servers 226 may include at least one virtual router and at least one container or virtual machine.

Gateway 230A-230B (collectively, "gateway 230", which may be examples of layer 3 routers) may provide virtual private network (VPN) services for providing connectivity over a wide area network (WAN). Tenant isolation may be performed for a tenant application workload using a standards-based VPN. Gateway 230 may provide resiliency across availability zones in public and private cloud environments. Gateway 230 may be configured for role-based access control (RBAC) and integration with active directory/lightweight directory access protocol (AD/LDAP). In some examples, gateway 230 may enable distributed SDN controller 250, SDN controller 214, and/or virtual routers 260A-260B to transport packets, including containers, between public cloud computing infrastructure 220 and data center 210. Gateway 230 may use an encrypted connection (e.g., IPSec with Nat-t or SSL) to exchange information between gateway portals 230A and 230B. In some examples, gateway 230 may create BGP tunnel 238A or BGP tunnel 238B to facilitate the exchange of routing information between data center 210 and distributed SDN controller 250. In other examples, gateway 230 may create an MPLS tunnel 240 to facilitate packetized communication between virtual router (vROUTER) 260A of data center 210 and virtual router (vROUTER) 260B of public cloud computing infrastructure 220. In this manner, the MPLS data plane may be extended between public cloud computing infrastructure 220 and data center 210.

Figure 4:
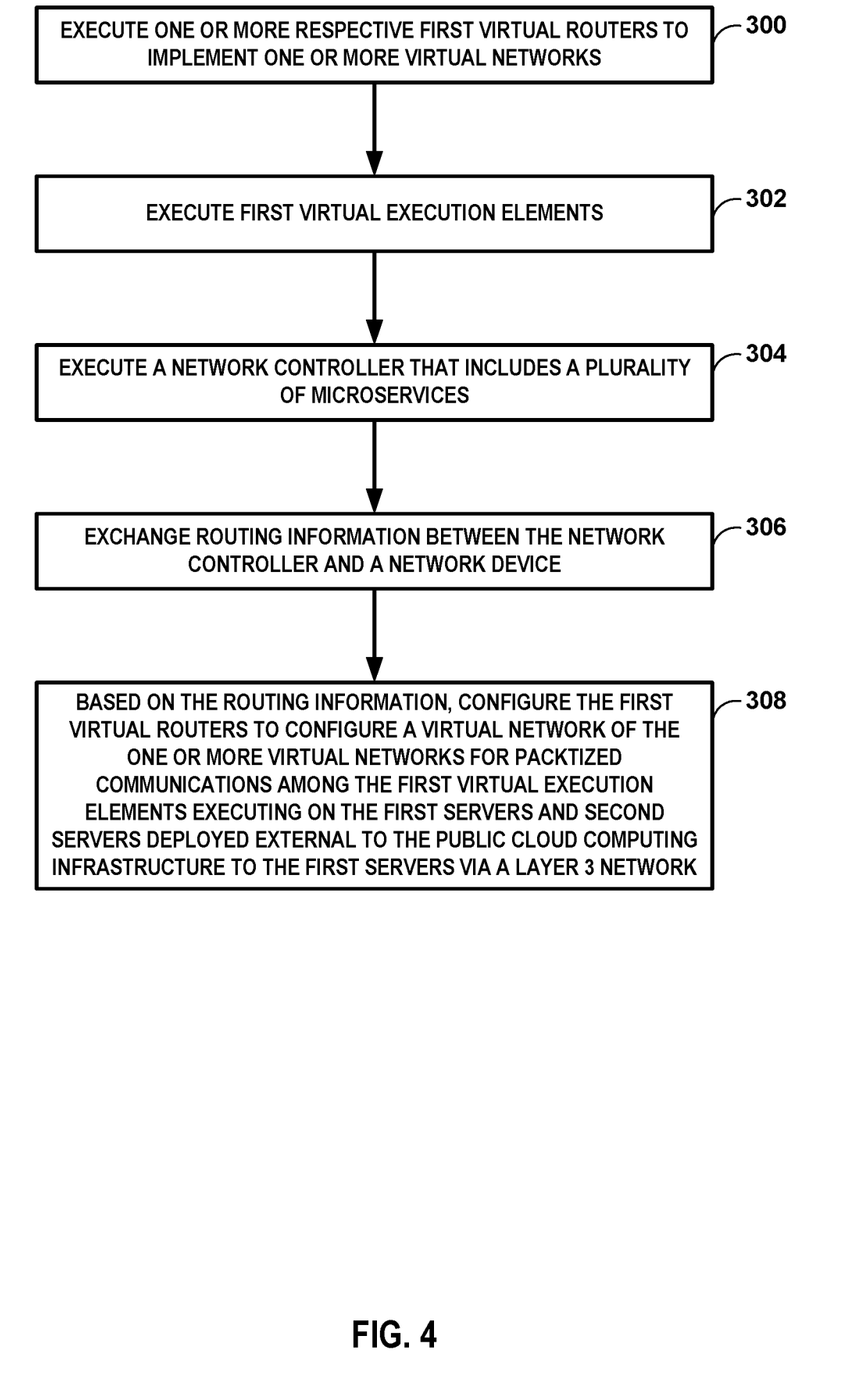
FIG. 4 is a flowchart illustrating example techniques for extending a SDN between public cloud computing infrastructure and a data center according to this disclosure.

FIG. 4 is a flowchart illustrating example techniques for extending an SDN between public cloud computing infrastructure and a data center according to this disclosure. First servers may execute respective first virtual routers to implement one or more virtual networks (300). For example, servers 126 and 128 may each execute virtual routes to implement one or more virtual networks. First servers may execute first virtual execution elements (302). For example, servers 126 and 128 may each execute virtual execution elements. The first virtual execution elements may execute a network controller that includes a plurality of microservices (304). For example, virtual execution elements on servers 126 and 128 may execute the network controller as a plurality of microservices similar to network controller 24 of FIG. 1.

The network controller may exchange routing information between the network controller and the network device (306). For example, the network controller executing on servers 126 and 128 may create a BGP tunnel between the network controller and the network device of data center 114 and may exchange routing information with the network device of data center 114 using or via BGP. In some examples, the network device of data center 114 may provide routing information to the network controller executing on servers 126 and 128. In some examples, the network controller is a first network controller and the network device includes a second network controller.

Based on the routing information, the network controller may configure the first virtual routers to configure a virtual network of the one or more virtual networks for packetized communications among the first virtual execution elements executing on the first servers in the public cloud computing infrastructure and second servers deployed external to the public cloud computing infrastructure to the first servers via a layer 3 network (308). For example, the network controller executing on servers 126 and 128 may configure the virtual routers executing on servers 126 and 128 to configure a virtual network for packetized communications among the first virtual execution elements executing on the first servers (e.g., servers 126 and 128) in public cloud computing infrastructure and the second servers (e.g., servers 130 and 132). For example, one or more of the first virtual routers executing on servers 126 and 128 may connect servers 130 and 132 to servers 126 and 128 via a layer 3 network, such as IP/MPLS network 108. In some examples, the network routing for the second servers is managed by a network device. In some examples, the network device is a network controller (e.g., network controller 24 of FIG. 1). In other examples, the network device is a layer 3 router.

In some examples, the virtual routers may create one or more MPLS tunnels when configuring the virtual network. In some examples, the first virtual routers are configured with an MPLS tunnel (e.g., of MPLS tunnels 122) to the second servers. In some examples, the MPLS tunnel may be an MPLSoUDP tunnel. In some examples, the MPLS tunnel may be an MPLSoMPLS tunnel.

In some examples, the second servers (e.g., servers 130 and 132) are deployed in an on-premise cloud edge. In some examples, the first servers (126 and 128) execute a Kubernetes service. In some examples, the first servers include minion nodes of a Kubernetes cluster. In some examples, the network controller provides a CNI for configuring network interfaces for the first execution elements.

Public cloud 104 may include a virtual private cloud comprising a subnet, of which servers 126 and 128 are members. Servers 126 and 128 may be a Kubernetes cluster. A pod network of pods comprising containers may be deployed to servers 126 and 128 and network controller may configure a virtual network to connect the pods for a service network of a Kubernetes service. (A Kubernetes service is an abstraction which defines a logical set of Pods and a policy by which to access them.) The network controller executing on servers 126 and 128 may configure a load balancer in one of servers 126 and 128 to implement the external IP address for the Kubernetes service. The load balancer may configured in a virtual router.

In order to facilitate network communication between the pods executing on servers 126, 128 and pods executing on servers 130, 132, a network controller executing on servers 130, 132 may configure route targets in the network (e.g., in router 134) for servers 130, 132 such that /32 routes can be shared for all connected devices and, as a result, enable communication between any of servers 126, 128 and any of servers 130, 132. At that point, virtual routers executed by any of these servers 126, 128, 130, 132 may establish MPLS tunnels 122 with one another in order to implement virtual networks across IP/MPLS network 108, with overlay tunnels (e.g., MPLSoMPLS, MPLSoUDP, etc.) enabling communications among pods executing on of servers 130 and 126, for example, even though server 126 is part of a virtual private cloud. As a result, workloads of server 130 can access the Kubernetes service implemented at least in part by server 126. Server 126 may be configured to implement the load balancer, for instance.

In some examples, a virtual private cloud of public cloud (104) computing infrastructure includes the first servers (e.g., servers 126, 128). In some examples, the layer 3 network (e.g., IP/MPLS network 108) connects a gateway for the virtual private cloud (e.g., VPC gateway 124) to a gateway for the second servers (e.g., servers 130, 132).

In some examples, router 134 or a gateway for the second servers (e.g., servers 130, 132) is configured with a route target to advertise a /32 route for a server of the second servers. In some examples, a virtual router executed by a server of the first servers (e.g., servers 126, 128) obtains routing information for the /32 route. In some examples, as part of configuring the virtual network, the virtual router executed by the server of the first servers (e.g., servers 126, 128) is configured to establish, using the routing information for the /32 route, an MPLS tunnel (e.g., of MPLS tunnels 122) with the server of the second servers (e.g., servers 130, 132). In some examples, a virtual private cloud of the public cloud computing infrastructure (e.g., in public cloud 104) includes the first servers (e.g., servers 126, 128) and the first servers implement a Kubernetes service. In some examples, the server of the first servers (e.g., servers 126, 128) implements a load balancer for the Kubernetes service. In some examples, the server of the second servers (e.g., servers 130, 132) accesses the Kubernetes service using the MPLS tunnel.

Various components, functional units, and/or modules illustrated above and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A system comprising:
   first servers deployed in a public cloud computing infrastructure;
   respective first virtual routers configured for execution by the first servers to implement one or more virtual networks;
   first virtual execution elements configured for execution by the first servers;
   a first network controller configured for execution by the first virtual execution elements, the first network controller including a plurality of microservices;
   wherein the first network controller is configured to exchange routing information with a second network controller, the second network controller being configured to manage network routing for second servers deployed external to the public cloud computing infrastructure and connected to the first servers via a layer 3 network, and
   wherein the first network controller is configured to configure, based on the routing information, the first virtual routers to configure a virtual network of the one or more virtual networks for packetized communications among the first virtual execution elements executing on the first servers in the public cloud computing infrastructure and the second servers.

2. The system of claim 1, wherein the second servers are deployed in an on-premise cloud edge.

3. The system of claim 1, wherein the first servers are configured to execute a Kubernetes service.

4. The system of claim 3, wherein the first servers comprise minion nodes of a Kubernetes cluster.

5. The system of claim 1, wherein the first network controller is configured to exchange routing information with the second network controller using Border Gateway Protocol (BGP).

6. The system of claim 1, wherein as part of configuring the virtual network, the first virtual routers are configured with a Multiprotocol Label Switching (MPLS) tunnel to the second servers.

7. The system of claim 6, wherein the MPLS tunnel is an MPLS over User Datagram Protocol (MPLSoUDP) tunnel.

8. The system of claim 6, wherein the MPLS tunnel is an MPLS over MPLS (MPLSoMPLS) tunnel.

9. The system of claim 1, wherein the first network controller is further configured to provide a Container Network Interface (CNI) for configuring network interfaces for the first virtual execution elements.

10. The system of claim 1,
    wherein a virtual private cloud of the public cloud computing infrastructure comprises the first servers, and
    wherein the layer 3 network connects a gateway for the virtual private cloud to a gateway for the second servers.

11. The system of claim 1,
    wherein a router or gateway for the second servers is configured with a route target to advertise a /32 prefix route for a server of the second servers,
    wherein a virtual router executed by a server of the first servers obtains routing information for the /32 prefix route, and
    wherein as part of configuring the virtual network, the virtual router executed by the server of the first servers is configured to establish, using the routing information for the /32 prefix route, a Multiprotocol Label Switching (MPLS) tunnel with the server of the second servers.

12. The system of claim 11,
    wherein a virtual private cloud of the public cloud computing infrastructure comprises the first servers,
    wherein the first servers implement a Kubernetes service,
    wherein the server of the first servers implements a load balancer for the Kubernetes service, and
    wherein the server of the second servers accesses the Kubernetes service using the MPLS tunnel.

13. A method comprising:
    executing, by first servers deployed in a public cloud computing infrastructure, respective first virtual routers to implement one or more virtual networks;
    executing, by the first servers, first virtual execution elements;
    executing, by the first virtual execution elements, a first network controller that includes a plurality of microservices;
    exchanging routing information between the first network controller and a second network controller configured to manage network routing for second servers deployed external to the public cloud computing infrastructure , and
    based on the routing information, configuring, by first network controller, the first virtual routers to configure a virtual network of the one or more virtual networks for packetized communications among the first virtual execution elements executing on the first servers in the public cloud computing infrastructure and the second servers deployed external to the public cloud computing infrastructure to the first servers via a layer 3 network.

14. The method of claim 13, wherein the second servers are deployed in an on-premise cloud edge.

15. The method of claim 13, further comprising executing, by the first servers, a Kubernetes service.

16. The method of claim 13, wherein the exchanging routing information is via Border Gateway Protocol (BGP).

17. The method of claim 13, wherein configuring the virtual network comprises configuring, by the first virtual routers, a Multiprotocol Label Switching (MPLS) tunnel to the second servers.

18. A non-transitory computer-readable medium storing instructions, that when executed, cause processor circuitry to:
- execute first virtual routers on first servers deployed in a public cloud computing infrastructure, to implement one or more virtual networks;
- execute first virtual execution elements on the first servers;
- execute a first network controller that includes a plurality of microservices on the first virtual execution elements;
- exchange routing information between the first network controller and a second network controller managing network routing for second servers deployed external to the public cloud computing infrastructure, and
- configure, based on the routing information, the first virtual routers to configure a virtual network of the one or more virtual networks for packetized communications among the first virtual execution elements executing on the first servers in the public cloud computing infrastructure and the second servers deployed external to the public cloud computing infrastructure to the first servers via a layer 3 network.

* * * * *